INVENTOR.
JOHN A. PAIVANAS
BY John C. Le Fever
ATTORNEY

United States Patent Office 3,199,715
Patented Aug. 10, 1965

3,199,715
INSULATION CONSTRUCTION
John A. Paivanas, Williamsville, N.Y., assignor to Union Carbide Corporation, a corporation of New York
Filed July 20, 1962, Ser. No. 211,229
21 Claims. (Cl. 220—9)

This invention relates to an improved composite multi-layered insulation in a vacuum space between relatively warm and cold boundaries, as for example the inner vessel and the outer casing of a double-walled container for low-boiling liquefied gases such as helium and hydrogen.

The problem of transporting and handling very low-boiling gases such as helium and hydrogen in liquid form is much more severe than that of transporting liquid oxygen and nitrogen. For example, the heat required to vaporize 1 liter of liquid helium is approximately 3 B.t.u., or about 1 percent of the heat required to vaporize 1 liter of liquefied oxygen. Consequently, great care must be taken to minimize the amount of heat that passes through the container into the liquid helium. At atmospheric pressure liquid helium boils at about —269° C., and unless a highly efficient insulating system is provided, a substantial portion of the stored liquid will evaporate due to atmospheric heat inleak. This in turn results in pressure rise, which must be relieved by venting and consequent loss of product. On the other hand, the commercial usage of these very low-boiling liquefied gases has expanded in recent years to the point where large quantities are required at locations remote from the point of liquefaction. This means that the containers must be of rugged construction and readily portable.

In U.S. Patent No. 3,007,596, issued November 7, 1961, to L. C. Matsch, there is described a composite multi-layered external load-free insulation in a vacuum space. The insulation comprises low-conductive fibrous sheet material layers composed of fibers for reducing heat transfer by solid and gaseous conduction, and thin, flexible sheet radiation barrier layers, e.g. metal foils. The radiation barrier layers are supportably carried in superposed relation by the fibrous sheet layers to provide a large number of radiation barrier layers in a limited space for reducing the transmission of radiation heat across the vacuum space without perceptively increasing the heat transmission by solid conduction thereacross. Each radiation barrier layer is disposed in contiguous relation on opposite sides with a layer of the fibrous sheet material, the fibers being oriented substantially parallel to the radiation barrier layers and substantially perpendicular to the direction of heat inleak across the insulating space. The fibrous sheet material is composed of fibers having diameters less than about 10 microns, the radiation barrier sheet has a thickness less than about 0.2 mm., and the multi-layered composite insulation is so disposed in the vacuum space to provide more than 4 radiation barrier layers per inch of composite insulation.

U.S. Patent No. 3,009,600, issued November 21, 1961, in the name of L. C. Matsch, describes a preferred low-conductive material for use in this multi-layered insulation, namely permanently precompacted paper composed of unbonded fibers having diameters less than about 5 microns and a length of less than about 0.5 inch. The paper is preferably formed of glass fibers.

The superlative performance of these insulating systems is well known. Occasionally, however, special requirements are encountered which present problems in their use.

One important problem with known reflective shield and low-conductive fiber insulations is the limitation on further reduction in thermal conductivity. For such materials this limitation is imposed by the rather sharp minima exhibited by insulation performance curves such as those shown in FIG. 5, in which thermal conductivity is the ordinate and the number of shield-fiber layers per inch is the abscissa. The overall thermal conductivity increases due to radiation on one side of the minimum and increases due to solid conduction on the other. Thus, one of these contributors can be diminished only at the expense of increasing the other, and for a given selection of materials, improvement below the minimum point cannot be achieved.

Significant improvement of shield-fiber insulations is possible by varying the materials, and more specifically by reducing the thickness of the low conductive sheet which separates the shields. By reducing sheet thickness and by proper use of bulking techniques to relieve the sheet of compression, new performance curves can be obtained whose minima correspond to a higher frequency of radiation shields and to lower overall conductivity.

Unfortunately, practical limits are imposed upon the minimum thickness in which papers can be produced in quantity and handled in commercial insulations. It is difficult to obtain uniform deposition of fibers during manufacture of extremely thin papers. It is very tedious to handle such fragile materials without tearing. Moreover, it will be apparent that the use of radiation shields in large numbers adds further to the time and cost of installing the insulation.

A widely used form of composite multi-layered insulation consists of 0.25 mil thick aluminum foil and precompacted glass paper composed of fibers weighing 1.6 grams/sq. ft. Performance curves for two such insulations are shown in FIG. 5. With normal precompaction to a thickness of about 4 mils (curve 1), a minimum conductivity of $0.0235 \times 10^{-3}$ B.t.u./hr. sq. ft. is obtained with 50 shields per inch thickness. Curves 2 shows the effect of precompacting a 1.6 gm. paper more highly to a thickness of about 2 mils. The minimum conductivity now corresponds to $0.021 \times 10^{-3}$ and about 60 shields/inch.

Further improvement can be obtained by using fewer fibers in paper manufacture. Curve 3 in FIG. 5 shows that with a 0.72 gm./sq. ft. paper, a minimum conductivity of $0.0155 \times 10^{-3}$ B.t.u./hr. sq. ft. ° F./ft. can be achieved at about 98 shields/inch However, this is about the maximum improvement that can be achieved in view of the practical limitations previously enumerated. Whereas a fourth curve in FIG. 5 for 0.3 gm./sq. ft. paper shows that still lower thermal conductivities can nominally be achieved, it has been found that the paper is too fragile and delicate for economic usage. Thus, while conductivities as low as $0.0125 \times 10^{-3}$ have been observed in the laboratory, it has not been possible to apply these conductivities to commercial needs.

Other problems arise in the use of known shield-fiber insulations, and result from the high thermal conductivity of the foils. For example, situations are encountered where heat flows through the insulation from two directions. The effectiveness of the insulation is largely confined to obstructing heat flow in a direction essentially normal to reflective shield orientation. In cases where a substantial temperature difference exists in the insulation system in a direction parallel to the shield orientation, then large amounts of heat can be transported along the reflective shields which are usually composed of a highly conductive metal.

Another problem is encountered when multi-layer insulations containing continuous shields are required to conform to complex curvatures, such as spheres or the end closures of cylindrical vessels. Indiscriminate folding or crumpling of the insulation layers may result in short circuits developing between the shield layers, thereby nullifying the effectiveness of the insulation between such short-circuited shields. The thin shield may also be torn during the folding step, thereby exposing radiation windows through the insulation.

Usually the techniques necessary to avoid or reduce the problems created by foil conductivity are expensive and time consuming. Often the corrective measures require individual handling and arrangement of the foil layers, so that the problems are intensified as the total number of shields is increased.

There exists a long-standing need for a high-quality insulation which is thermally homogeneous, in the sense that it would exhibit high resistance to heat flow in all directions and by all modes of heat transfer. Such an insulation should help alleviate the above-mentioned problems of two-directional heat flow and short circuiting.

An example of one such homogeneous material is the opacified powder disclosed in U.S. Patent No. 2,967,152 issued to L. C. Matsch et al. on January 3, 1961. Thermal conductivities on the order of $0.3 \times 10^{-3}$ B.t.u./hr. °F., sq. ft. are readily obtained by proper compositions of this type. Although the conductivity of such insulation is generally an order of magnitude greater than those of U.S.P. 3,007,596, the opacified powder is nevertheless a reasonable approach to a solution of the above-described problems encountered with alternate-layer insulations. It is not necessary to employ the opacified powder throughout the entire insulation system since its use can be confined only to those parts of the system which are difficult to cover with alternate-layer material as a consequence of the curvature of surfaces or the existence of pipes and connections.

Nevertheless, the use of opacified powders to any extent in the insulation system is a less-than-ideal solution to the problem. In order that the admixture of powders will remain homogeneous, the low-conductive component must be of extreme fineness; and such materials are usually quite expensive. The powder mixture must also be prepared in the dry state, and it is difficult and expensive to obtain complete homogeneity in the preparation. Extremely fine metallic particles are also subject to oxidation, and special precautions must be taken to prevent the reflective qualities of the material from being impaired during and after preparation of the powder mixtures. In general, powders are more difficult to evacuate than are fiber materials, due at least in part to the very high adsorptive power of the fine powders. Special provisions are usually required to prevent carry-over of powder from the insulation system to the evacuation equipment. Finally, powder material exhibits strong settling tendencies and as settling occurs, the surfaces in the uppermost parts of the insulation system may be exposed, or at least be covered by inadequate thickness of insulation.

It is therefore an important object of the present invention to provide an improved vacuum-insulation system for reducing heat transmission by all modes of heat transfer to values well below that of any known insulating systems, particularly for minimizing heat inleak to very low boiling liquefied gases such as helium and hydrogen.

Another object is to provide such an improved composite multi-layered insulation system in which heat transfer in a direction parallel to the layers is readily controlled and limited.

A further object is to provide such an improved composite multi-layered insulation which may be readily conformed to complex curved surfaces.

Further objects and advantages of this invention will be apparent from the ensuing disclosure and the appended claims.

In the drawings.

Corresponding items in the various figures have been identified by the same number in the interest of simplicity.

Figure 1:
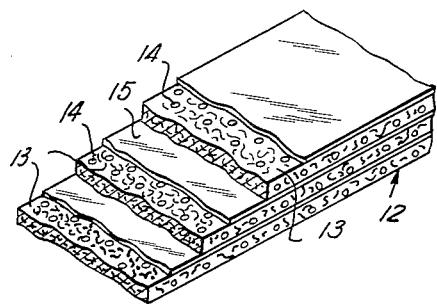
FIG. 1 is an isometric view of a composite insulating material embodiment of the invention shown in a flattened position with parts broken away to expose underlying layers.

According to the present invention, a composite multi-layered insulation is provided for use in a vacuum space having warm and cold boundaries. The insulation contains low-conductive fibrous sheet material layers of permanently precompacted paper composed of fibers having diameters less than 20 microns. The paper layers contain finely-divided radiant heat reflecting bodies of sizes less than about 500 microns, preferably less than 50 microns, and having metallic surfaces. That is, the largest dimension of the bodies is less than 500 microns. The reflecting bodies are uniformly dispersed throughout the paper layers in an amount between about 10% and 60% by weight of the paper. Less than about 10% reflecting bodies does not achieve as significant opacifying effect whereas greater than 60% produces bridging of such bodies through and along the paper surface. The latter results in a solid conductive path.

Thin, flexible radiant heat reflecting shields of less than about 0.2 mm. thickness are supportably carried in superimposed relation by the paper layers, each shield being disposed in contiguous relation on opposite sides with a paper layer to provide between about 4 and 200 shields per inch of the composite insulation. This range represents a balance between a sufficient number of shields to effectively interrupt radiative heat transfer, and the maximum number of shields that can be advantageously used for this purpose.

The fibers of the paper layer are oriented substantially perpendicular to the direction of heat inleak across the vacuum space. Also, for insulations of circular cross-section, the multi-layered composite is preferably spirally wound in the vacuum space.

The density of the reflecting body-containing paper may be objectionably high for some uses. It has also been discovered that the density of the novel insulation may be appreciably reduced by the employment of low heat conductive bulking material layers between at least some of the paper layers having a total surface area contiguously associated with a minor part of the surface area of the paper layers, adjacent bulking material layers across the insulating space being at least partially aligned with each other.

The term "vacuum," as used herein, is intended to apply to sub-atmospheric absolute pressure conditions not substantially greater than 500 microns of mercury, and preferably below 100 microns of mercury. For superior quality results, the pressure should preferably be below 25 microns of mercury.

It will be seen that the use of reflecting body-containing paper to separate shields in composite multi-layered insulation achieves more complete radiation blockage than the same number of shields separated by plain fibrous paper. Thus, the reflecting body-containing paper achieves the effect of using many more reflective shields in the insulation than are actually provided. In order to obtain maximum benefit from this effect, the number of shields must not be materially reduced as a consequence of using the reflecting body-containing separator. Hence, the requirement for a thin, precompacted paper still applies.

There is considerable evidence that the precompaction of a fiber-reflective flake composite paper produces a surface effect which further enhances the ability of the material to block radiation. Thermal conductivity tests were conducted using two precompacted papers, both consisting of Type 106 glass fiber with 30 wt.-percent aluminum flakes. One paper weighed 6.4 gm./sq. ft. while the other weighed 2.48 gm./sq. ft. In both tests, the sheets were wrapped without foil shields to a density of about 12 lb./cu. ft. The 6.4 gm./sq. ft. material at 68 layers/inch exhibited a conductivity of $0.125 \times 10^{-3}$ B.t.u./hr. sq. ft. ° F./ft., while the 2.48 gm./sq. ft. material at 185 layers/inch gave a conductivity of only $0.085 \times 10^{-3}$ B.t.u./hr. sq. ft. ° F./ft.

In other similar tests with 30% aluminum-glass fiber paper, 2.48 gm./sq. ft. and 1.1 gm./sq. ft. papers were compared without foils at about 4.5 lb./cu. ft. density. Conductive values of $0.162 \times 10^{-3}$ and $0.085 \times 10^{-3}$ B.t.u./hr. sq. ft. ° F./ft., respectively, were obtained.

From the above tests, it is seen that equal quantities of identically composed material can produce widely different results. Many layers of thin paper are far more effective insulators than a few layers of thicker material. This is believed due to the previously mentioned surface effect produced by precompaction, and which results in a more effective radiation barrier.

The inclusion of reflecting bodies in the fiber structure must be accomplished without significantly affecting the solid conductance of the paper. We have found that large amounts of metal may be precompacted with the fiber without noticeably increasing the solid conductance. Electrical resistance measurements were made on glass papers containing 30% by weight aluminum, in order to show the degree of metal flake isolation—i.e. to indicate the extent to which flake-to-flake bridging through the paper was prevented by the fibers. The electrical measurements showed infinite resistance through the paper thickness and also across the paper surface, indicating that the fibers did in fact prevent metal bridging.

The combination of foils and reflecting body-containing papers affords thermal insulations far superior to the prior art materials. One well-known form of alternate layer insulation consists of ¼ mil aluminum fols separated by Type 106 glass fiber mat weighing 2.5 gm./sq. ft. At a density of 22 shields/inch the conductivity is about $0.125 \times 10^{-3}$ B.t.u./hr. sq. ft. ° F./ft. For comparison, an insulation was prepared using 2.48 gm./sq. ft., 30% aluminum-Type 106 glass fiber paper. Eight layers of this paper were applied between adjacent ¼ mil aluminum foils to give the same (22/inch) shield density as before. This thermal conducitivity of this insulation was only $0.025 \times 10^{-3}$, or ⅕ as much as with plain glass.

Figure 5:
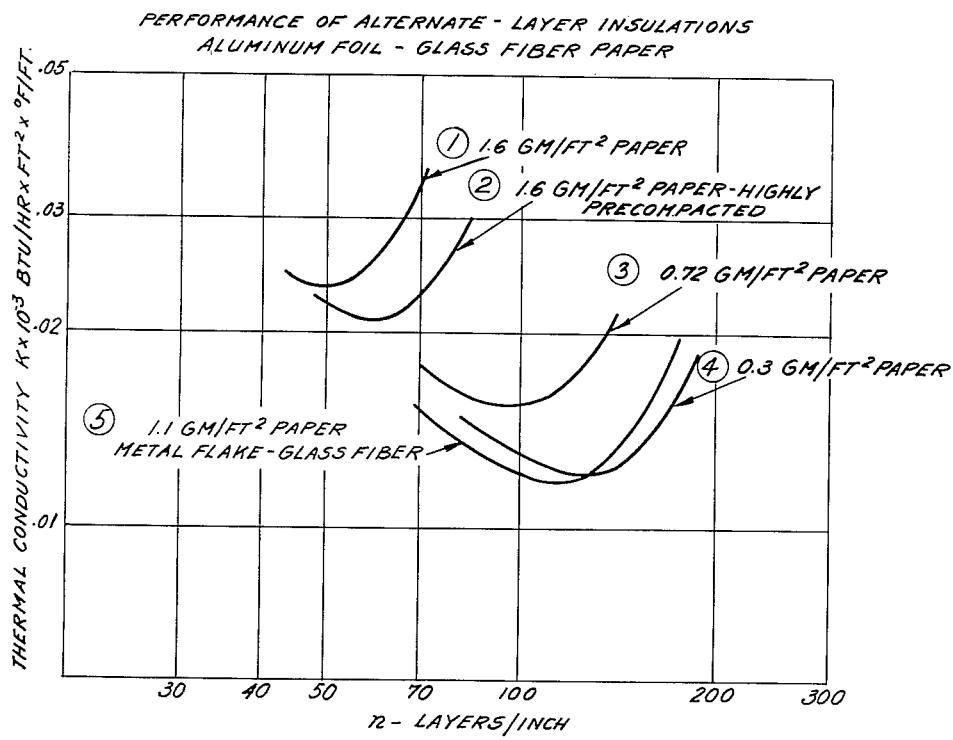
FIG. 5 is a graph showing the effect of varying the number of layers per inch on the thermal conductivity of prior art insulation and the instant composite multi-layered insulation.

The possibilities presented by this new composite insulation are seen more clearly with reference to FIG. 5. As discussed previously, curves 1–4 demonstrate the progression of improvement achievable by reducing the thickness of plain glass fiber papers. The 0.72 gm./sq. ft. material (curve 3) with a conductivity of $.016 \times 10^{-3}$ B.t.u./hr. sq. ft. ° F./ft. represents the practical limit for such materials owing to the fragile nature of the fiber sheets. Using the reflecting body-containing papers of this invention, a stronger separating sheet is obtained weighing 1.1 gm./sq. ft. and capable of being handled in commercial systems. Now the barrier to further improvement is removed and a conductivity of only $$0.012 \times 10^{-3}$$

is obtained (curve 5). Furthermore, this thermal conductivity is below that reached with the impractical, 0.3 gm./sq. ft. material (curve 4) and is achieved with fewer foil shields.

Test results with the new insulation composites also dramatically show how they may be employed to alleviate the before-mentioned problems due to high thermal conductivity of foils. The improvement is achieved by considerably reducing the required number of foil shields, and thereby reducing the time used in arranging foils to prevent unwanted heat flow.

A widely used form of composite multi-layered insulation (see curve 2, FIG. 5) consists of 0.25 mil thick aluminum foil and plain glass paper having fibers ranging from 0.5 to 0.75 microns in diameter and a sheet weight of 1.6 gms./sq. ft. At a shield density of about 60/inch and an overall density of about 5.1 lbs./cu. ft., this insulation exhibits a thermal conductivity of $0.021 \times 10^{-3}$ B.t.u./ hr. sq. ft. ° F./ft. under a vacuum of less than 1 micron Hg and between boundary temperatures of ambient and liquid nitrogen. This may be compared with the beforementioned test in which the foils were separated by 8 layers of 30% aluminum-glass fiber paper weighing 2.48 gms./sq. ft. The conductivity was $0.025 \times 10^{-3}$, approximately equal to the 60 layer/inch insulation, but with only 22 foil shields/inch. This represents a substantial savings in cost of the insulation.

Still further shield reduction was obtained in another test wherein the last-mentioned insulation was bulked with a double strip of 2.48 gm./sq. ft., 30% aluminum glass paper. Three continuous layers of the 30 wt.-percent aluminum, 2.48 gm./sq. ft. glass paper were applied between foils to obtain a shield density of only 19/inch, less than one-third the number used with plain glass fiber. Again the conductivity was $0.025 \times 10^{-3}$.

Thus, in cases where special care is needed to avoid shield short circuiting, as in covering the ends of vessels or insulating around supports and connections to the vessel, considerable advantage will result from the use of only a few foil shields as permitted by this invention. Also, where lateral heat flow along the foils is a problem, the adverse effects can be much reduced or more easily eliminated by the use of fewer foils.

The new insulation composites described above are particularly beneficial where it is mandatory that the insulation at all points of the system be of quality equivalent to the highest quality aluminum foil-precompacted glass fiber composite. For example, if the cylindrical portion of a vessel is insulated with high quality aluminum foil-precompacted glass fiber composite, the ends or heads can be insulated just as effectively by using a small number of reflecting shields between the windings of reflecting body-containing paper at the ends of the vessel, e.g. one reflecting shield for each 3 layers of reflecting body-containing paper. The procedures for folding the insulation over the heads of the vessel are much simpler than with alternating reflecting shields, since the risk of short circuiting becomes less as the number of reflecting shields is reduced. Whereas the aluminum foil-glass fiber paper composite must be end-folded layer by layer throughout the wrapping procedure, the present insulation composite may be end-folded 2, 3, or more layers at a time, thus saving considerable time, labor, and expense.

It will be seen that the reflective body-containing paper of this invention is used in lieu of additional foil shields which otherwise would be required to achieve equivalent heat flow resistance in a direction normal to the plane of the layers. The reflective body-containing paper acts as an effective radiation barrier, yet does not exhibit the strong lateral heat conductance of metal foils. Instead it possesses low solid conductivity equivalent to plain glass paper, and in all directions. From a practical viewpoint, the material is thermally homogeneous and may be advantageously used in zones of two-directional heat flow.

While the approximate, electrical measurements on the reflective body-containing paper showed uniformly zero conductance both through and along the sheet, more sensitive thermal conductivity measurements showed the heat conductance parallel to the sheet to be appreciably greater than through the sheet thickness. This is to be expected, in view of the lateral orientation of the fibers whose length is much greater than their diameters. The glass fibers exhibit virtually zero electrical conductance but exhibit measureable thermal conductance. Thus, precise thermal conductivity measurements on a tightly wrapper 30 wt.-percent aluminum paper gave a value of $38 \times 10^{-3}$ B.t.u./hr. sq. ft. ° F./ft. parallel to the sheet and a value of $0.085 \times 10^{-3}$ B.t.u./hr. sq. ft. ° F./ft. through the thickness normal to the sheet. While the parallel conductivity appears large compared to the normal conductivity, it is manyfold less than would result if aluminum foils were present and between the layers. The conductivity of aluminum is 3,000 times greater than the observed parallel conductivity of wrapped aluminum flake paper. It is this low parallel conductivity relative to aluminum foil containing paper that renders the metal flake-containing paper essentially thermally homogeneous.

The reflecting body-containing paper may, for example, be formed on standard paper-making machines in the following manner, using colloidal silica binder. The latter is preferably provided in the form of a colloidal silica aqueous sol, or alternatively as the hydrolyzed form of a compound such as tetraethylsilicate. First, the paper fibers and the reflecting bodies are thoroughly admixed in the desired proportions to form a defibered, substantially homogeneous aqueous dispersion in a papermill beater or mixing device. The binder, i.e. colloidal silica, is added to the dispersion in quantities of about 2 to 20% by weight of the fiber-reflecting body mixture. With colloidal silica the binder preferably comprises about 10 to 20% by weight of the paper sheet, while 2 to 10% weight is preferred when organic binders are used. The homogeneous aqueous dispersion is then fed into the headbox of the papermaking machine while simultaneously introducing therewith a solution of a cationic agent. The latter should be added in an amount of about 0.5 to 10.0 percent by weight of the fiber-reflecting body-binder mixture, and preferably is about 1 to 3% by weight. Cationic starches such as the amine-modified materials are suitable cationic agents. Exemplary of such amine-modified starches are Cato 8 (a modified cornstarch, and Cato Amylon (a hybrid starch containing 55–60% amylose), both sold by National Starch and Chemical Corporation of Plainfield, New Jersey.

The pH of the headbox dispersion should generally be maintained in the range of about 2.7–6. For fibers of glass, quartz and mineral wool, the pH is preferably maintained in the range of about 2.8–4. Ceramic fibers preferably utilize a pH of about 4–6. Prior to the headbox, the pH of the dispersion should also be maintained in the same ranges. The adjustment of the pH can be readily attained by the addition of acids such as sulfuric.

The dispersion containing the defibered material, the reflecting bodies, the binder and the cationic agent is deposited upon the wire of the papermaking machine to form the reflecting body-containing paper, then compacted by, for example, compression rolls or by vacuum and finally dried in accordance with conventional practice in the art.

Instead of inorganic binders such as colloidal silica, organic binders may be used separately or in combination with inorganics in the preparation of reflective body-containing paper. These include polyvinylidene chloride, polyvinylacetate, polyvinylchloride, polyvinyl alcohol, cellulosic compounds such as carana gum or guar gum, acrylic resins as methylmethacrylate, formaldehyde resins and epoxy resins (in the emulsified form). Silicones such as the phenyl methyl compounds would also be suitable binders.

The fibers may, for example, be formed of glass, ceramic, quartz, or potassium titanate, depending on the temperatures to which the composite multi-layered insulation will be exposed. For example, at temperatures below about 900° F. glass fibers are preferred but at higher temperatures glass tends to soften and the other enumerated materials are more suitable. When glass fibers are used they are preferably of less than 5 microns diameter while a fiber diameter range of 0.2 to 3.8 micron gives best results. The above range represents a preferred balance between increasing frailness and cost of relatively small diameter fibers, and increased conductance and gas pressure sensitivity of relatively large diameter fibers. Glass fibers having diameters in the range of 0.2 to 0.5 micron such as those commercially designated as 104 or AAAA fiber, and fibers designated as 106 or AAA fiber having diameters in the range of 0.5 to 0.75 micron are normally available as papers, and are especially suitable for practicing this invention. Glass fibers as large as those designated class B having diameters between 2.5 and 3.8 microns can also be employed satisfactorily with an appropriate binder.

The finely-divided radiant heat reflecting bodies may, for example, be formed of aluminum, copper, nickel and molybdenum. Again the selection of the reflecting body is influenced by the operating temperature of the insulating composite. Aluminum is stable at temperatures below about 900° F., and is preferred in this range. Copper is a practical alternative to aluminum at below 900° F., and is the preferred reflecting body at temperatures between 900° F. and about 1,730° F., its melting point being 1,981° F. The 1,730° F. temperature limitation is based on maintaining the copper vapor pressure below 0.01 micron Hg. Molybdenum has an extremely high melting point of 4,750° F., but to maintain its vapor pressure below 0.01 micron Hg, the practical range for use of molybdenum is limited to temperatures below about 3.490° F. Nickel is an attractive reflecting material for temperatures between about 1740° F. (limit for copper) and 2110° F. The upper limit of 2110° F. is considerably below its melting point (2,650° F.) and again is established by the requirement that the vapor pressure of the metal be maintained below 0.01 micron Hg. It should be recognized that considerations other than the thermal softening point may be determining in the selection of the radiant heat reflecting body. For example, safety factors may preclude the use of a readily oxidizable material such as aluminum in oxygen service.

Certain organic compositions may be used as the low conductive fibrous sheet material of the present invention, as for example the viscose material known commercially as rayon, the polyamide known as nylon, the condensation product of dimethyl terephthalate and ethylene glycol which is known commercially as Dacron, the vinyl chloride-acrylonitrile copolymer known as Dynel, and cotton.

Best results are obtained when the radiant heat reflecting bodies are relatively small, with particle sizes of less than 50 microns. Aluminum and copper paint pigment flakes of less than 0.5 micron thickness are especially suitable for relatively low-temperature systems. For example, one commercially available aluminum flake is a polished, low-residual-grease powder with a 98% passage through a 325 mesh screen (44 microns). An electron microscopic particle size determination indicates the majority of particles are between 2 and 14 microns size.

In general, the construction materials suitable as the radiant heat reflecting bodies may also be employed as the thin, radiant heat reflecting shield. Suitable materials are either a metal or metal-coated material such as aluminum-coated polyethylene terephthalate film. When metals are used, there is an additional requirement that the construction material be capable of being formed into a thin flexible sheet. Again depending on the temperatures to be encountered, the following materials may be employed: aluminum, copper, tin, silver, gold, cadmium, nickel, and molybdenum. Thin metallic foils of less than 0.2 mm. thickness are especially suitable, aluminum and copper foils being preferred for relatively low-temperature systems.

Referring now to the drawings, and FIG. 1 in particular, the composite insulation 12 includes low conductive fibrous sheet material layers 13 of permanently precompacted paper containing finely-divided radiant heat reflecting bodies 14 having metallic surfaces uniformly dispersed throughout the paper layers in all directions. A thin, flexible radiant heat reflecting shield 15 is periodically interposed between adjacent paper layers and is supportably carried thereby. That is, each reflecting shield is disposed in contiguous relation on opposite sides with a paper layer, and the fibers of the paper layers are oriented substantially parallel to the reflecting shields.

Figure 2:
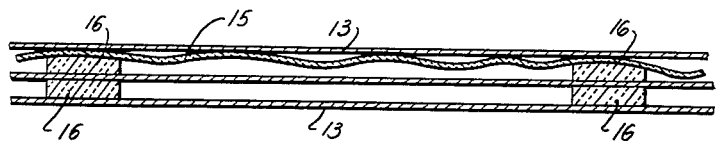
FIG. 2 is an elevation view taken in cross-section of a composite multi-layered insulation similar to the FIG. 1 embodiment but additionally illustrating the employment of bulking strips.

FIG. 2 illustrates another embodiment of the invention in which bulking strips 16 are interposed between adjacent paper layers 13. These strips are preferably a low conductive fibrous material having a low thermal sensitivity to compression. Each strip may consist of a single ribbon of bulking material, or several ribbons may be combined to produce the desired total thickness. The strips are preferably of the same composition and form as the reflecting-body containing paper layer 13. Other suitable bulking materials include paper material without reflective bodies, and uncompacted and elastically compressed "webs." It will be noted that adjacent bulking material layers 16 across the composite-insulation are at least partially aligned over and in registry with the bulking material under previously applied layers. Otherwise effective bulking and reduction in overall density of the insulation is not achieved. Viewing the multpile-layer insulation in cross-section, the bulking component preferably produces a relatively dense "column" structure through the insulation thickness. This column preferentially supports the layers and transmits the interlayer compression to the supporting wall. Areas between the "columns" are at very low density, and may actually be less dense than the self-supporting density. Bulking of multi-layered composite insulation is described more completely in copending application S.N. 118,739, filed June 21, 1961, by L. C. Matsch et al., incorporated herein to the extent pertinent, now abandoned in favor of continuation-in-part application Serial No. 306,371 filed September 3, 1963.

Figure 3:
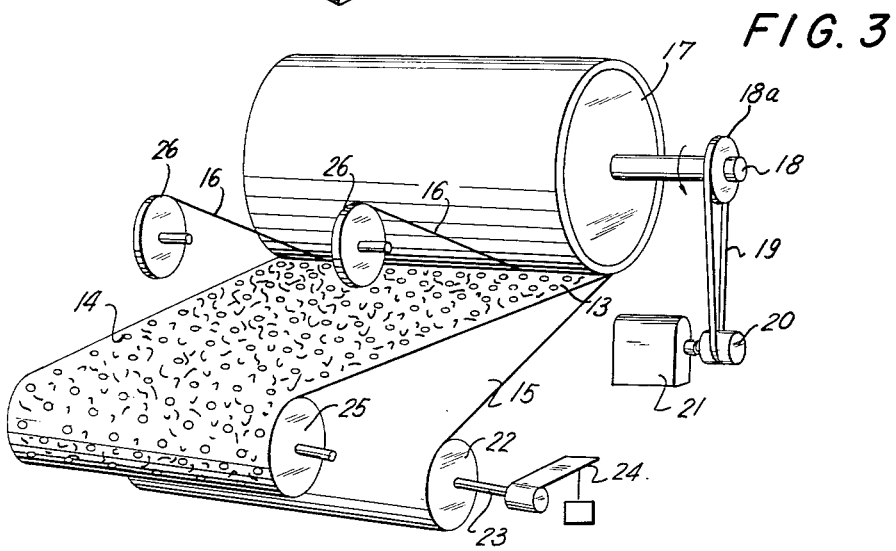
FIG. 3 is an isometric view of apparatus suitable for wrapping the FIG. 2 insulation around a container.

Apparatus suitable for assembling the bulked insulation of FIG. 2 is shown in FIG. 3. Container 17 is mounted horizontally on axial spindle 18 and is power-driven by sheave 18a, belt 19, speed controller 20 and motor 21. Reflecting shield roll 22 is mounted on axle 23 fitted with friction brake 24 to adjust the roll tension and thereby control the insulation density. Reflector body-containing paper sheet roll 25 is mounted to rotate freely and feed sheet 15 onto container 17. The feeding of reflector sheet 15 onto container 17 may be terminated at will by severing the wrapped portion from roll 22 in a direction parallel to the roll axis. The wrapping of paper 13 around container 17 may then be continued for as many turns as desired before the reflecting shield 15 is again inserted between the paper sheet 13 and the container insulated surface for wrapping. Alternatively a plurality of paper rolls 25 may be provided and fed simultaneously onto the container to provide as many paper layers as desired between successive foils. Such procedures may be continued until the desired number of composite insulation layers have been formed around container 17. If used, bulking strips 16 are fed without appreciable tension from individual, free rotating rolls 26, in a manner similar to reflecting shield 15.

Figure 4:
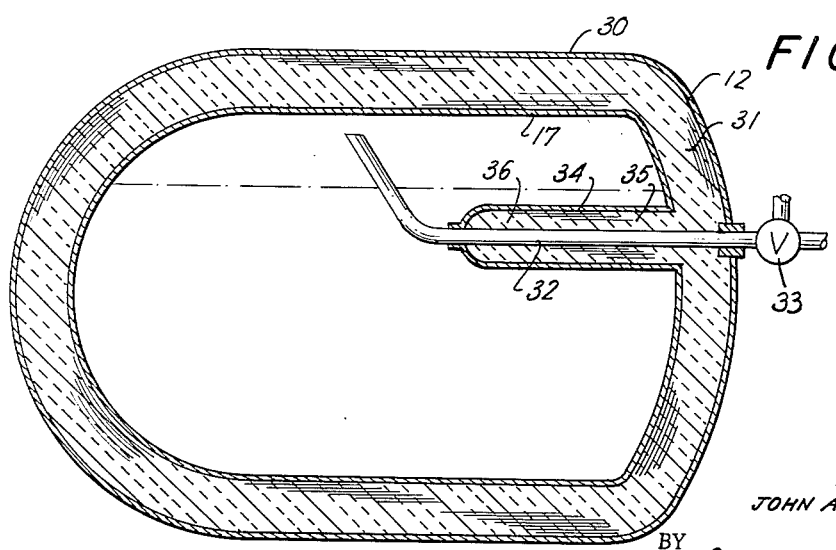
FIG. 4 is a front elevational view, partly in section, of a double-walled low-boiling liquefied gas container employing the principles of the present invention.

Shown in FIG. 4 is a double-walled heat insulating container comprising liquefied gas storing inner vessel 17 and outer casing 30 and an evacuated insulating space 31 therebetween. Disposed within the insulation space is a composite multi-layered insulating material 12 of the type characterized by curve 5 of FIG. 5, embodying the principles of the present invention to achieve effective thermal isolation of vessel 17. Conduit 32 extends laterally through insulation 31 and the inner end terminates within inner vessel 17 while the outer end terminates in liquid filling-discharge valve 33. Sleeve 34 forming a wall portion of the inner vessel 17 is concentrically positioned around conduit 32 so that an annular space 35 exists therebetween. Annular space 35 communicates with and forms part of the evacuated insulating space 31, and is filled with composite insulation 36. The latter is preferably wrapped with the insulation 36 so that the layers are parallel to the length of conduit 32.

With respect to any point along the insulated length of conduit 32, temperature differences exist to drive heat in two directions: (a) radially outward toward the cold contents of inner vessel 17, (b) longitudinally inward from the warm contact with the outer casing 30. If the conventional alternate layered aluminum foil-glass fiber composite were used to insulate conduit 32, it would effectively obstruct the radial heat leak (a), but its continuous foils will augment the longitudinal heat leak (b). Special handling and arrangement of the foil layers is often needed to avoid excessive longitudinal heat leak. For example, the foil layers may be applied as relatively narrow isolated strips rather than as full-width sheets. The present insulation is ideal for conduit 32 because it minimizes the special handling needed in such areas.

A series of tests were conducted using glass paper containing 30% by weight aluminum flakes of less than 50 microns size and 14% by weight colloidal silica binder, with 0.25 mil aluminum foil. Using bulking strips of the same paper, the density of the insulation was varied from 174.4 layers/inch down to 74 layers/inch. The tests were conducted under a pressure of less than 1 micron Hg and between boundary temperatures of ambient and liquid nitrogen. The results of these and previously described tests are summarized in Table 1, below.

*Table 1*

| Item | Insulation | Layers/ in. Paper | Density, lb./cu. ft. | Thermal Conductivity, K×10⁻³ B.t.u./hr. sq. ft. °F./ft. |
|---|---|---|---|---|
| 1 | Type 106 glass paper, 1.6 gm./sq. ft. alternating with ¼-mil Al foils. | 70 | 5.1 | 0.021 |
| 2 | 30% Al-glass paper, 2.48 gm./sq. ft. | 185 | 12.1 | 0.085 |
| 3 | 30% Al-glass paper, 2.48 gm./sq. ft. with ¼-mil Al foil every 8 layers. | 175 | 12.5 | 0.025 |
| 4 | 30% Al-glass paper, 2.48 gm./sq. ft. with ¼-mil Al foil every 3 layers and with double-weight bulking strip (2.48 gm./sq. ft.). | 56.9 | 5.05 | 0.025 |
| 5 | 30% Al-glass paper, 1.10 gm./sq. ft. alternating with ¼-mil Al foil. | 174.4 | 12.4 | 0.020 |
| 6 | Item 5 with single-weight bulking strip (2.48 gm./sq. ft.). | 117 | 8.9 | 0.012 |
| 7 | Item 5 with double-weight bulking strip (2.48 gm./sq. ft.). | 74 | 5.28 | 0.0145 |

An inspection of Table 1 reveals that the thermal conductivity of the already high-quality glass paper-aluminum foil insulation (Item 1) was reduced about 50% by the present invention (Items 5–7). Also, the thermal conductivity of aluminum flake-containing glass paper (Item 2) was reduced to only 29% of its original value by adding an aluminum foil between every 8 layers of paper. This was unexpected as one would logically conclude that no advantage would exist in combining aluminum foils with aluminum flake-containing glass fiber, since the foil and the flakes would appear to serve the same function. That is, both act as reflecting barriers to the transfer of heat by radiation.

The effect of wrapping density on the Item 7 insulation is shown in curve 5 of FIG. 5. It is seen that its optimal density is about 110 to 120 layers per inch, while its advantage over the glass paper-aluminum foil insulation of curve 3 is obtained between about 65 and 155 layers per inch.

Other compositions of paper and radiant heat reflecting bodies have been prepared and tested primarily for high-temperature service. These results are summarized in the following Table 2.

Table 2

| Insulation [1] | Layers, Paper/in. | Density, lb./cu. ft. | Temperature Range, °F. | Thermal Conductivity, K× $10^{-3}$ Btu./hr. sq. ft. °F./ft. |
|---|---|---|---|---|
| 45% copper-ceramic, 10.35 gm./sq. ft. only | 58.1 | 15.9 | 120–1,255 | 5.83 |
| 45% copper-ceramic paper, 10.35 gm./sq. ft. alternating with ½-mil copper foil | 51 | 24.5 | 80–1,255 | 0.79 |
| Do | 51 | 24.5 | 90–1,635 | 0.94 |
| 45% nickel-ceramic paper 8.91 gm./sq. ft. alternating with ⅛-mil iron-nickel alloy foil | 61.2 | 18.5 | 180–1,500 | 3.5 |
| Do | 61.2 | 18.5 | 180–2,108 | 9.35 |

[1] The binder was 18.5% by weight colloidal silica.

The particular ceramic sheet employed in the Table 2 tests is approximately 5 mils thick. This ceramic fiber is reported by the manufacturer to have a melting point of 3,200° F. and to possess a thermal conductivity in air of 0.058 B.t.u./hr. sq. ft. °F./ft. at a mean temperature of 1,000° F. One type of suitable ceramic paper material has the following chemical analysis: $Al_2O_3$—51.3%, $SiO_2$ 45.3%, and $ZrO_2$—3.4%. Another satisfactory ceramic fiber paper has the following chemical analysis: $Al_2O_3$—51.2%, $SiO_2$—47.4%, $B_2O_3$—0.7%, and $Na_2O$—0.7%. Such materials are sold by the Carborundum Company, Niagara Falls, New York, under the name of "Fiberfrax."

The mechanical advantages of the present composite insulation are impressive. The settling characteristics of powderous insulations do not exist, and the installed composite is as readily evacuated as the low-conductive fiber-reflecting sheet forms of insulation.

Referring to Table 2, it will be noted that a higher wt.-percent nickel and copper was employed in these papers than was used in Table 1. This is due primarily to the higher specific gravity of copper as compared to aluminum. That is, the specific gravity of copper is three times greater than aluminum and with equal size metal flakes, there will be only about ⅓ as much reflective surface area in a 30% copper composite as in a 30% aluminum composite. It would be necessary to use about 60% copper by weight in order to obtain reflective area equivalent to 30% aluminum. A similar relationship exists between nickel and aluminum.

As previously indicated, the reflecting body should constitute between about 10% and 60% by weight of the paper. With aluminum flakes, a range of 10% to 40% by weight gives optimum results, whereas a range of 30% to 60% by weight is preferred with copper flakes.

Although preferred embodiments of the invention have been described in detail, it is to be understood that modifications and variations may be effected without departing from the spirit and scope of the invention.

What is claimed is:

1. A composite multi-layered insulation for use in a vacuum space comprising low-conductive fibrous sheet material layers of permanently precompacted paper composed of fibers having diameters less than 20 microns, the paper layers containing finely-divided radiant heat reflecting bodies of sizes less than about 500 microns in an amount between about 10% and 60% by weight of said paper and having metallic surfaces being uniformly dispersed throughout the paper layers and separated by said fibers; and thin, flexible radiant heat reflecting shields of less than about 0.2 mm. thickness being supportably carried in super-imposed relation by said paper layers, each shield being disposed in contiguous and coextensive relation on opposite sides with a paper layer, the fibers of said paper layer being oriented substantially parallel to the heat reflecting shields and substantially perpendicular to the direction of heat inleak across the vacuum space, and said multi-layered composite insulation being arranged in the vacuum space to provide between about 4 and 250 paper layers per inch of said composite insulation.

2. Insulation according to claim 1 in which the paper layers are formed of a member selected from the group consisting of glass, quartz, potassium titanate, and ceramic fibers.

3. Insulation according to claim 1 in which the paper layers are formed of glass fibers.

4. Insulation according to claim 1 in which the paper layers are formed of quartz fibers.

5. Insulation according to claim 1 in which the paper layers are formed of potassium titanate fibers.

6. Insulation according to claim 1 in which the paper layers are formed of ceramic fibers.

7. Insulation according to claim 1 in which the paper layers are formed of glass fibers having diameters of about 0.2 to 3.8 microns.

8. Insulation according to claim 1 in which said heat reflecting body is a member selected from the group consisting of aluminum, copper, molybdenum, nickel and copper-coated mica.

9. Insulation according to claim 1 in which said heat reflecting body is aluminum flakes of less than about 50 microns size.

10. Insulation according to claim 1 in which the paper layers are formed of glass fibers having diameters of about 0.2 to 3.8 microns, and said heat reflecting body is aluminum flakes of less than about 50 microns size in an amount between about 10% and 40% by weight of said paper.

11. Insulation according to claim 1 in which said heat reflecting body is copper flakes of less than about 50 microns size.

12. Insulation according to claim 1 in which the paper layers are formed of glass fibers having diameters of about 0.2 to 3.8 microns, and said heat reflecting body is copper flakes of less than about 50 microns size in an amount between about 30% and 60% by weight of said paper.

13. Insulation according to claim 1 in which the paper layers are formed of quartz fibers and said heat reflecting body is metal flakes of less than about 50 microns size.

14. Insulation according to claim 1 in which the paper layers are formed of glass fibers having diameters of about 0.2 to 3.8 microns, said heat reflecting body is aluminum flakes of less than about 50 microns size, and said radiant heat reflecting shield is aluminum foil.

15. Insulation according to claim 1 in which the paper layers are formed of glass fibers having diameters of about 0.5 to 0.75 microns, said heat reflecting body is aluminum flakes of less than about 50 microns size and constituting about 30% by weight of said paper, and said radiant heat reflecting shield is aluminum foil of about 0.25 mil thickness.

16. Insulation according to claim 1 in which the radiant heat reflecting shields are formed of metal foil.

17. Insulation according to claim 1 in which the radiant heat reflecting shields are formed of aluminum foil.

18. Insulation according to claim 1 in which the radiant heat reflecting shields are formed of copper foil.

19. A double-walled liquefied gas container comprising an inner vessel; an outer casing surrounding said inner vessel so as to provide an evacuable space therebetween; a composite multi-layered, external load-free insulation in said space comprising low conductive fibrous sheet material layers of permanently precompacted paper composed of fibers having diameters less than 20 microns, the paper layers containing finely-divided radiant heat reflecting bodies of sizes less than about 500 microns in an amount between about 10% and 60% by weight of said paper and having metallic surfaces being uniformly dispersed throughout the paper layers and separated by said fibers; and thin, flexible radiant heat reflecting shields of less than about 0.2 mm. thickness being supportably carried in superimposed relation by said paper layers, each shield being disposed in contiguous and coextensive relation on opposite sides with a paper layer, the fibers of said paper layer being oriented substantially parallel to the heat reflecting shields and substantially perpendicular to the direction of heat inleak across the evacuable space, and said multi-layered composite insulation being arranged in the evacuable space to provide between about 4 and 250 paper layers per inch of said composite insulation.

20. A double-walled liquefied gas container according to claim 21 in which the paper layers are formed of glass fibers having diameters of about 0.2 to 3.8 microns, and said heat reflecting body is aluminum flakes of less than about 50 microns size in an amount between about 10% and 40% by weight of said paper.

21. A double-walled liquefied gas container comprising an inner vessel; an outer casing surrounding said inner vessel so as to provide an evacuable space therebetween; a composite multi-layered, external load-free insulation in said space comprising low conductive fibrous sheet material layers of permanently precompacted paper composed of glass fibers having diameters of about 0.2 to 3.8 microns, the paper layers containing finely-divided radiant heat reflecting bodies of sizes less than about 50 microns in an amount between about 10% and 60% by weight of said paper and having metallic surfaces being uniformly dispersed throughout the paper layers and separated by said fibers; and thin, flexible radiant heat reflecting metal foil shields of less than about 0.2 mm. thickness being supportably carried in superimposed relation by said paper layers, each metal foil shield being disposed in contiguous and coextensive relation on opposite sides with a paper layer, the fibers of said paper layer being oriented substantially parallel to the heat reflecting shields and substantially perpendicular to the direction of heat inleak across the evacuable space, and said multi-layered composite insulation being generally spirally wound in the evacuable space to provide between about 65 and 155 paper layers per inch of said composite insulation.

References Cited by the Examiner
UNITED STATES PATENTS

| | | | |
|---|---|---|---|
| 2,037,813 | 4/36 | Munters | 161—162 X |
| 2,677,965 | 5/54 | Saffir | 206—16.5 |
| 2,967,152 | 1/61 | Matsch et al. | 252—62 |
| 3,007,596 | 11/61 | Matsch | 154—44 X |
| 3,009,600 | 11/61 | Matsch | 220—9 |
| 3,009,601 | 11/61 | Matsch | 220—9 |

THERON E. CONDON, *Primary Examiner.*

EARLE J. DRUMMOND, *Examiner.*